United States Patent
Matsuoka

(10) Patent No.: US 8,587,883 B2
(45) Date of Patent: Nov. 19, 2013

(54) LENS TUBE, IMAGE PICKUP DEVICE, AND PORTABLE TERMINAL APPARATUS

(75) Inventor: Kouichirou Matsuoka, Kyoto (JP)

(73) Assignee: Panasonic Corporation, Osaka (JP)

( * ) Notice: Subject to any disclaimer, the term of this patent is extended or adjusted under 35 U.S.C. 154(b) by 73 days.

(21) Appl. No.: 13/375,063

(22) PCT Filed: Aug. 5, 2010

(86) PCT No.: PCT/JP2010/004928
§ 371 (c)(1),
(2), (4) Date: Nov. 29, 2011

(87) PCT Pub. No.: WO2011/024387
PCT Pub. Date: Mar. 3, 2011

(65) Prior Publication Data
US 2012/0147489 A1    Jun. 14, 2012

(30) Foreign Application Priority Data
Aug. 31, 2009   (JP) ................................ 2009-199714

(51) Int. Cl.
*G02B 7/02*      (2006.01)
(52) U.S. Cl.
USPC ........................................................ 359/819
(58) Field of Classification Search
USPC ................................. 359/818–820
See application file for complete search history.

(56) References Cited

U.S. PATENT DOCUMENTS

| | | | |
|---|---|---|---|
| 5,781,351 A | 7/1998 | Murakami et al. | |
| 7,626,773 B2 | 12/2009 | Noda et al. | |
| 8,070,304 B2 | 12/2011 | Matsuoka et al. | |
| 2008/0100932 A1 | 5/2008 | Noda et al. | |
| 2008/0190241 A1* | 8/2008 | Kuwahara et al. | 74/838 |
| 2009/0310223 A1 | 12/2009 | Matsuoka et al. | |

FOREIGN PATENT DOCUMENTS

| | | |
|---|---|---|
| CN | 100462763 C | 2/2009 |
| CN | 100510825 C | 7/2009 |
| JP | 9-35312 A | 2/1997 |
| JP | 2000098208 | 4/2000 |
| JP | 2004354482 | 12/2004 |
| JP | 2008145929 | 6/2008 |

OTHER PUBLICATIONS

International Application No. PCT/JP2010/004929, International Search Report mailed Nov. 30, 2010, 7pgs.

* cited by examiner

*Primary Examiner* — James Jones
(74) *Attorney, Agent, or Firm* — RatnerPrestia

(57) ABSTRACT

A rear lens located nearest to an image-forming plane in a compound image pickup lens has a barrel insert portion formed around a peripheral edge inserted in a lens holding portion, and an out-of-barrel lens portion in continuity to the barrel insert portion, of an outer diameter larger than an inner diameter of the lens holding portion and having a confronting surface at a position spaced from an end surface of the lens holding portion, wherein at least the end surface of the lens holding portion and the confronting surface of the out-of-barrel lens portion are fixed with a first adhesive through a spaced portion. The structure can prevent the first adhesive from sticking to the surfaces of image pickup lens.

8 Claims, 5 Drawing Sheets

LENS TUBE, IMAGE PICKUP DEVICE, AND PORTABLE TERMINAL APPARATUS

This application is a U.S. National Phase Application of PCT International Application PCT/JP2010/004928.

TECHNICAL FIELD

The present invention relates to lens tubes, image pickup devices, portable terminal apparatuses and the like.

BACKGROUND ART

There is a growing demand in recent years for miniature-sized image pickup devices provided with wide-angle lenses capable of taking images in wide angles for use in portable phones and the like apparatuses equipped with cameras. One of such image pickup devices comprises, for instance, an image pickup lens housed in a holder with a cylindrical lens barrel, and an image sensor having a photoreceptor in the center and placed in a position of a predetermined distance with respect to the image pickup lens. The image pickup lens housed in the holder generally comprises a plurality of lenses. A rear lens located nearest to the image sensor (i.e., image-forming plane) is the largest in size among the plurality of lenses, and the rear lens is fixed by adhesion to the lens barrel of a size larger than an outer dimension of the rear lens.

A conventional art disclosed in Patent Literature 1 is one of the examples as known to be relevant to the structure of fixing a rear lens to a lens barrel by adhesion with consideration given to downsizing. Patent Literature 1 discloses a structure comprising a lens barrel provided with a ventilable slit opening (i.e., an aperture formed by cutting out a part of a peripheral edge of an image pickup lens (and a light shield) housed in the lens barrel), and a side surface of the rear lens is fixed by bonding to an end surface at an insertion side of the lens barrel while sucking the rear lens through the slit opening, for instance.

In the case of the image pickup device described in Patent Literature 1, however, there exists a problem of conflicting with downsizing since the lens barrel has an outer dimension larger than the largest external dimension of the rear lens that inevitably increases the size of the image pickup device with that of the lens barrel.

There is also a possibility that an adhesive material sticks to surfaces of other lenses housed in the lens barrel or gets into a space between the lenses in the process of fixing the side surface of the rear lens to the end surface at the insertion side of the lens barrel while sucking the rear lens. This results in other problems such as an increase in the possibility of forming ghost images (i.e., a phenomenon of admitting incident light blurred) attributed to the lens surface or degradation of resolution due to shifting of the optical axis of the lenses.

Citation List

Patent literature 1: Japanese Patent Unexamined Publication, No. 2008-145929

SUMMARY OF THE INVENTION

The present invention provides a lens tube, an image pickup device and a portable terminal apparatus with advantages of suppressing the possibility of forming ghost images attributed to a lens surface and degradation of resolution due to shifting of the optical axis of a lens by preventing an adhesive material used for bonding the image pickup lens and a lens barrel from sticking to the surface of the image pickup lens (i.e., the surface where incident light passes through), while also achieving downsizing.

The lens tube of the present invention comprises a compound image pickup lens made up of a plurality of lenses and a cylindrical lens barrel retaining the compound image pickup lens within an inner wall thereof. In the lens tube of the present invention, the lens barrel has a lens supporting portion formed at one end thereof for totally or partially supporting a peripheral edge at one side surface of the compound image pickup lens in the direction of optical axis, and a lens holding portion formed at the other end thereof confronting totally or partially a peripheral edge at the other side surface of the compound image pickup lens. In the lens tube of the present invention, a rear lens located nearest to an image-forming plane in the compound image pickup lens has a barrel insert portion formed around a peripheral edge, which is inserted in the lens holding portion. In addition, the lens tube of the present invention also comprises a out-of-barrel lens portion in continuity to the barrel insert portion, of an outer diameter larger than an inner diameter of the lens holding portion, and having a confronting surface at a position spaced from an end surface of the lens holding portion. Furthermore, the lens tube of the present invention is so constructed that at least the end surface of the lens holding portion and the confronting surface of the out-of-barrel lens portion are fixed with an adhesive material through the spaced portion.

An image pickup device of the present invention comprises a lens tube having the above structure, a holder retaining the lens tube, and an image sensor disposed with the center of image-forming plane in alignment with an optical axis of the lens tube retained in the holder. Moreover, a portable terminal apparatus of the present invention has a structure comprising an image pickup device of the above configuration.

It becomes possible by virtue of the above structure to suppress formation of ghost images attributed to the surface of compound image pickup lens and degradation of resolution due to shifting in the optical axis of the lens since the structure can prevent the adhesive material used for bonding the lens barrel and the compound image pickup lens from sticking to the surfaces of the image pickup lens (i.e., the surfaces where the incident light passes through), while also achieving downsizing.

DESCRIPTION OF EMBODIMENTS

Figure 1:
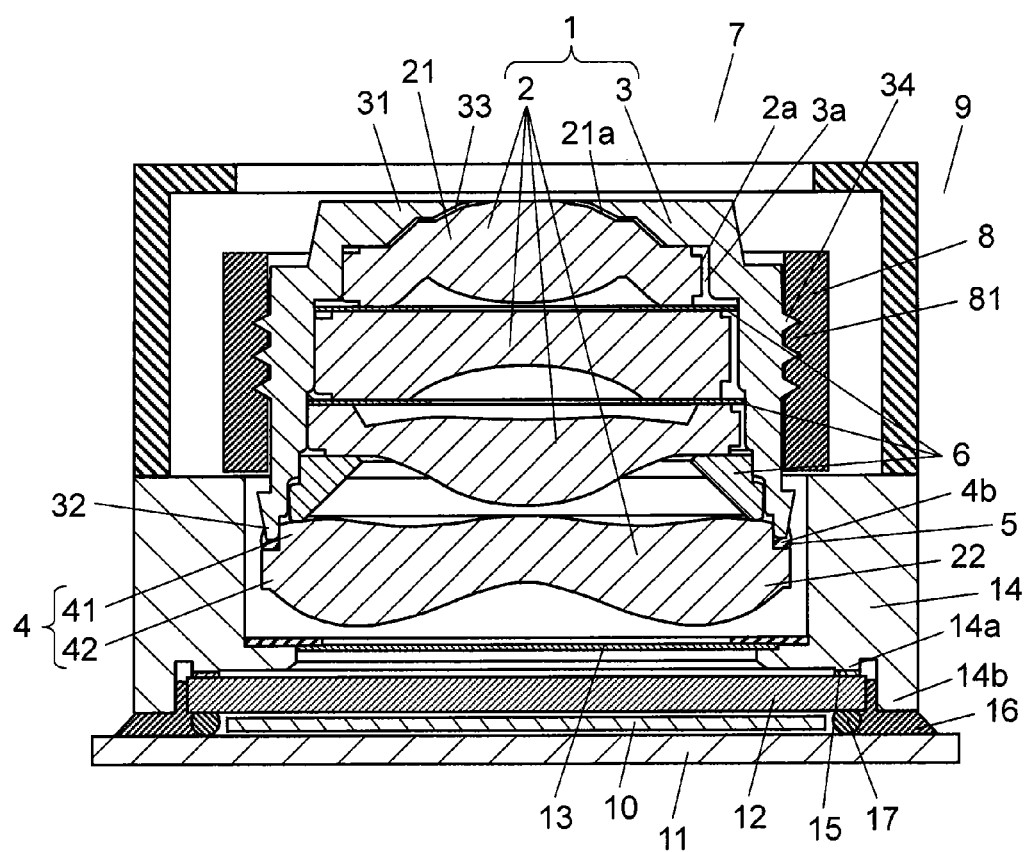
FIG. 1 is a sectioned side view illustrating a lens tube and an image pickup device according to one exemplary embodiment of the present invention.
Figure 2:
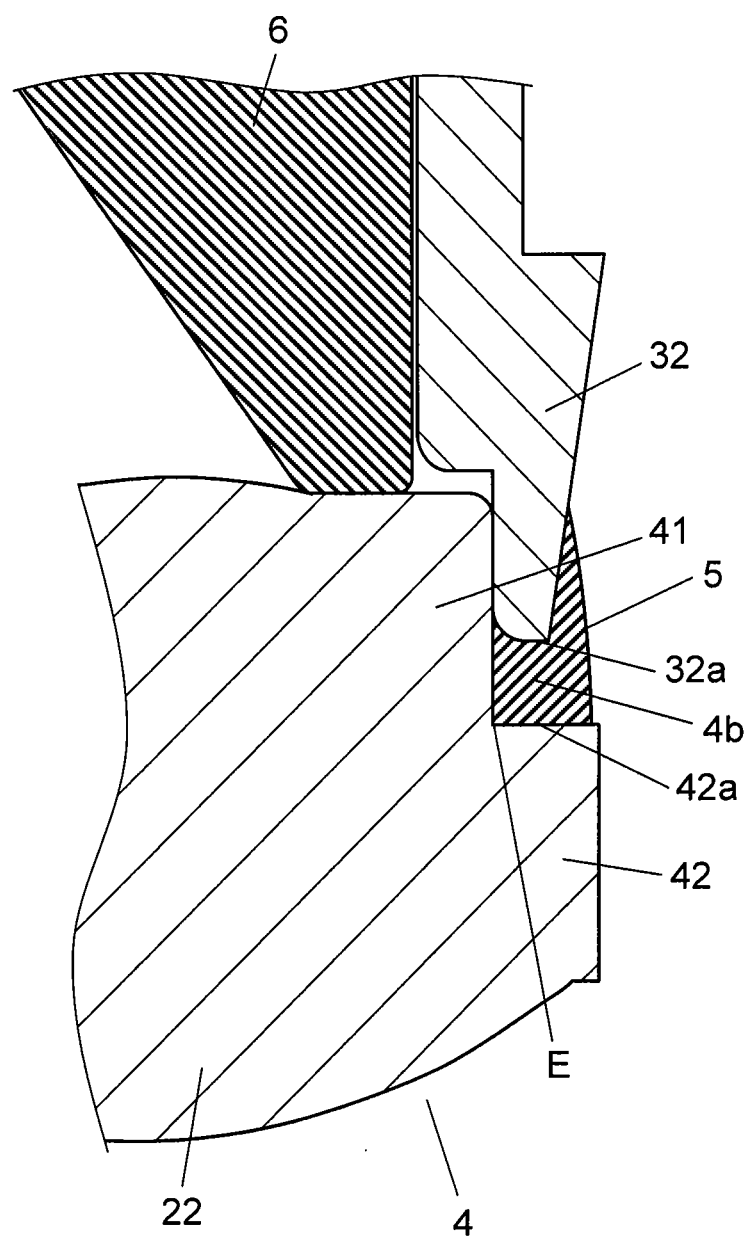
FIG. 2 is an enlarged sectional view of a lens holding portion of a lens barrel of the lens tube shown in FIG. 1.

Description is provided hereinafter of an exemplary embodiment of lens tube, image pickup device and portable terminal apparatus according to the present invention with reference to the accompanying drawings. FIG. 1 is a sectioned side view illustrating lens tube 1 and image pickup device 7 according to one embodiment of this invention. FIG. 2 is an enlarged sectional view of a lens holding portion of a lens barrel of the lens tube shown in FIG. 1.

As shown in FIG. 1, lens tube 1 of this embodiment comprises compound image pickup lens 2 and lens barrel 3 therein housing compound image pickup lens 2. More specifically, lens tube 1 comprises compound image pickup lens 2 made up of a plurality of lenses, each having a rim area (i.e., a portion of the lens shaped to become outside of an effective lens surface) in an outer periphery, and cylindrical lens barrel 3 retaining compound image pickup lens 2 within an inner wall thereof.

Compound image pickup lens 2 comprises plural pieces such as four pieces of concave and convex lenses. The individual lenses are different in their shapes and outside dimensions such as diameters. In particular, the nearer the lens to an image-forming plane (i.e., image sensor 10) the larger the size (outside dimension like the diameter) becomes. Therefore, front lens 21 located farthest from the image-forming plane is the smallest in size, and rear lens 22 located nearest to the image-forming plane is the largest in size. Rear lens 22 has a larger diameter at one side facing the image-forming plane than that of the object side, as shown in FIG. 1 and FIG. 2. Rear lens 22 is provided on its peripheral edge 4 with barrel insert portion 41 having a smaller diameter (that is, smaller in dimension by a margin of fitting allowance for clearance fit, or several micrometers) than an inner diameter of lens holding portion 32 of lens barrel 3, and out-of-barrel lens portion 42 in continuity to barrel insert portion 41, of an outer diameter larger than the inner diameter of lens holding portion 32 and having confronting surface 42a at a position spaced from end surface 32a of lens holding portion 32 of lens barrel 3 (i.e., the surface at one end of lens barrel 3 confronting the image-forming plane), as will be described later. For the purpose of explanation, out-of-barrel lens portion 42 is designated in this embodiment as a pressure-bearing lens portion since it is used for press-fitting rear lens 22 into lens barrel 3. It shall be noted, however, that the pressure-bearing lens portion for press-fitting rear lens 22 into lens barrel 3 needs not be limited only to out-of-barrel lens portion 42, but it may also include an effective lens surface of rear lens 22 in some cases. In other words, peripheral edge 4 or effective lens surface of rear lens 22 may be pressed directly when press-fitting rear lens 22 into lens barrel 3. An outer diameter of peripheral edge 4 of rear lens 22 is smaller than an outer diameter (i.e., maximum outer diameter) of lens holding portion 32. According to this embodiment, parts of the peripheral edges of compound image pickup lens 2 (except for rear lens 22) have cutouts 2a (e.g., D-cut groove or notch) for the reason of fabrication and molding.

Lens barrel 3 has a structure formed to accommodate compound image pickup lens 2 made of a plurality (four pieces in this embodiment) of lenses. That is, lens barrel 3 has lens supporting portion 31 formed at one end (i.e., the upper side of FIG. 1 and FIG. 2 confronting an object of photography) for totally or partially supporting a peripheral edge at one side surface of compound image pickup lens 2 in the direction of optical axis. In this embodiment, the phrase "supporting . . . in the direction of optical axis" means that the rim area (upper side) of front lens 21 is pressed against and retained by lens supporting portion 31 of lens barrel 3 in a manner to prevent it from tilting by a thrust force applied to rear lens 22 from the side of image sensor 10. According to this embodiment, lens supporting portion 31 is designed to retain front lens 21 in a manner to entirely cover the front side. However, It may be sufficient to retain front lens 21 partially at three positions, for instance, rather than covering the entire front side of front lens 21. In addition, lens barrel 3 has lens holding portion 32 formed at the other end (i.e., the end portion adjacent to the image-forming plane), which totally or partially confronts peripheral edge 4 (confronting surface 42a of pressure-bearing lens portion 42, to be specific) at the other side surface (i.e., the side next to image-forming plane, or lens 22 at the bottom side of FIG. 1 and FIG. 2) of the compound image pickup lens 2. FIG. 2 is an enlarged view of lens holding portion 32 of lens barrel 3. An outer peripheral surface at an end of lens holding portion 32 of lens barrel 3 is so tapered that the outer diameter becomes smaller toward the end, to be more specific as shown in FIG. 2. On the other hand, an inner peripheral surface at this end has a shape of curved surface (hereinafter referred to as R-shaped), of which a diameter becomes larger toward the end. The end of lens holding portion 32 having the tapered surface is also provided with a plurality of slits, holes, depressions, or the like around the peripheral surface at random or at regular intervals.

Lens barrel 3 also has opening 33 at the upper end thereof as shown in FIG. 1. This opening 33 serves a function of aperture of compound image pickup lens 2. Moreover, lens barrel 3 is provided with male screw 34 formed on outer surface thereof (for the purpose of engagement with holder 8 as will be described later).

Compound image pickup lens 2 is housed in a space from the lens supporting portion 31 to lens holding portion 32 of the above-mentioned lens barrel 3. More specifically, compound image pickup lens 2 and light shields (spacers) 6 are housed inside lens barrel 3. There is a cutoff formed in the outer periphery (rim area) of each of compound image pickup lens 2 (except for rear lens 22) as described above. The cutoff provides gap (space) 3a in a part between peripheral edge of compound image pickup lens 2 (other than rear lens 22) and inner periphery of lens barrel 3 as shown in the right side part of FIG. 1. Light shields 6 are placed individually between adjoining lenses at their peripheral edges. Light shields 6 are not provided with cutoffs in their portions corresponding to the cutoff (D-cut groove or notch) formed in compound image pickup lens 2. Among the plurality of lenses of compound image pickup lens 2 housed in lens barrel 3, front lens 21 located nearest to opening 33 of lens barrel 3 is so placed that an outer periphery of the upper surface (i.e., the object side surface) is in contact with the rear surface (opposite to the object side surface) of lens supporting portion 31. In addition, front lens 21 is housed inside lens barrel 3 in a manner that outer lens surface 21a at the center portion, other than the peripheral area, is kept spaced from the rear surface (opposite to the object side surface) of lens barrel 3 by a predetermined gap exceeding 0 μm but not exceeding 50 μm, for instance. Rear lens 22 located nearest to the image-forming plane is mounted to lens barrel 3 in a manner that barrel insert portion 41 is inserted in lens holding portion 32. Under this inserted position, confronting surface 42a, or a part of pressure-bearing lens portion 42 having an outer diameter larger than an inside diameter of lens holding portion 32 and in continuity to barrel insert portion 41 is held spaced from end surface 32a of lens holding portion 32. There is thus recessed portion 4b (hollow portion) formed between the end rim of lens barrel 3 and the outer periphery of rear lens 22. Recessed portion 4b is a concaved annular groove, to be specific, which is formed by lens holding portion 32 of lens barrel 3 and barrel insert portion 41 and pressure-bearing lens portion 42 of rear lens 22. In other words, it is a spaced channel left between lens holding portion 32 and pressure-bearing lens portion 42. This recessed portion 4b is filled with prescribed adhesive 5 (hereinafter referred to as first adhesive) to fix rear lens 22 to lens barrel 3. In specific, end surface 32a of lens holding portion 32 and confronting surface 42a of pressure-bearing lens portion 42 are fixed with first adhesive 5. Corner E formed between barrel insert portion 41 and confronting surface 42a is located in a position not to interfere with an optical path of the lens in order to reduce the height of the lens tube.

The principal ingredient of first adhesive 5 may be any of a thermosetting type adhesive and an UV curing type adhesive such as acrylic resin and epoxy resin, and the UV curing type adhesive is more preferable.

Description is provided next of a method of manufacturing lens tube 1 having the structure discussed above. Individual pieces of compound image pickup lens 2 and light shields 6 are inserted into lens barrel 3 in a given order of image pickup lens 2 and light shields 6 toward opening 33 of lens barrel 3. Front lens 21 located nearest to the opening of lens barrel 3 is placed to bring the outer periphery of the upper surface (the object side surface) into contact with the rear surface (the surface confronting the image-forming plane) of lens supporting portion 31. This makes front lens 21 so housed inside lens barrel 3 that outer lens surface 21a at the center portion other than the peripheral area keeps a predetermined space of 20 μm, for instance, from the rear surface (the surface that confronts the image-forming plane) of lens barrel 3. When inserting rear lens 22, the one located nearest to the image-forming plane into lens barrel 3, pressure-bearing lens portion 42 is pressed forward with rear lens 22 in the direction of the optical axis, and lens barrel 3 and rear lens 22 are fixed with adhesive while barrel insert portion 41 is held inserted in lens holding portion 32. In this specific instance, pressure-bearing lens portion 42 of rear lens 22 is pressed with light shield 6 or by a mechanical method such as a jig or the like tool to make a space of, for example, 30 μm or larger but not exceeding 1 mm in distance between end surface 32a of lens holding portion 32 and confronting surface 42a of pressure-bearing lens portion 42. It is more desirable, however, that the distance is kept between 50 μm and 500 μm. A bonding strength may become less sufficient if the spaced distance between end surface 32a of lens holding portion 32 and confronting surface 42a of pressure-bearing lens portion 42 is less than 30 μm since the adhesive cannot be applied smoothly into the spaced channel. When the distance exceeds 1 mm, on the other hand, it requires a larger amount of the adhesive and adversely affects to downsizing. The distance not smaller than 50 μm and not larger than 500 μm can provide reliable bonding strength, and desirable in the light of downsizing.

First adhesive 5 is applied into the spaced channel between end surface 32a of lens holding portion 32 and confronting surface 42a of pressure-bearing lens portion 42 in this manner while barrel insert portion 41 is kept inserted in lens holding portion 32, to thus complete bonding and fixing of end surface 32a of lens holding portion 32, confronting surface 42a of pressure-bearing lens portion 42 and a side surface of barrel insert portion 41 exposed from lens holding portion 32 by first adhesive 5. When a large amount of first adhesive 5 is applied in this case, a part of first adhesive 5 reaches the outer peripheral surface of lens holding portion 32 and increases an overall area of bonding, whereas first adhesive 5 tends to form a fillet shape at both edges of the spaced channel when the amount is small. In any cases, at least end surface 32a of lens holding portion 32 and confronting surface 42a of pressure-bearing lens portion 42 are fixed naturally with first adhesive 5 when the amount of first adhesive 5 is sufficient, or even if the amount is comparatively limited. It is hence possible to prevent ingress of first adhesive 5 into the interior side (i.e., interior space where all other lenses than rear lens 22 are housed) of lens barrel 3 to which rear lens 22 is fitted since lens barrel 3 and rear lens 22 are fixed by bonding in the above manner. In other words, first adhesive 5 is applied to the spaced channel between end surface 32a of lens holding portion 32 and confronting surface 42a of pressure-bearing lens portion 42 with rear lens 22 fitted into lens barrel 3. As a result, this makes first adhesive 5 not likely to stick to lens surfaces (the surfaces where the incident light passes through).

As shown in FIG. 1, image pickup device 7 mainly comprises the above-said lens tube 1 (image pickup lens 2 and lens barrel 3), housing 9 provided with cylindrical holder 8 accommodating image pickup lens 2 via lens tube 3, image sensor 10 having a photoreceptor in the center and placed in a position of predetermined distance from rear lens 22, substrate 11 carrying image sensor 10 mounted thereon, glass plate 12 covering image sensor 10, and infrared ray cut-off filter 13.

Housing 9 comprises holder 8 retaining lens barrel 3, and support base 14 supporting holder 8. In the case of a fixed-focus type like the one in this embodiment, a bottom face of holder 8 and a top surface of support base 14 are fixed with adhesive, for instance, though not explicitly shown in the figure. When it is an autofocus type, an actuator comprised of a shape-memory alloy is provided between holder 8 and support base 14 for making holder 8 movable in the direction of optical axis, as an example shown in Japanese Translation of PCT Publication, No. 2008-099156.

Holder 8 is a cylindrical shape, and it has female screw 81 formed on an inner surface. Male screw 34 of lens barrel 3 engages with female screw 81 of this holder 8.

Support base 14 has positioning portion 14a and projecting portion 14b at one side adjacent to the image-forming plane (the lower side in FIG. 1). Positioning portion 14a is for positioning lens barrel 3 and image pickup lens 2 retained by holder 8 mainly between the image-forming plane side and the object side (in the vertical direction in FIG. 1). Projecting portion 14b protrudes toward image sensor 10 (or, substrate 11, which is downward in FIG. 1).

Positioning portion 14a is formed into a flat shape having a predetermined surface area, and it has a perimeter of quadrangular shape in a plan view. Positioning portion 14a assists positioning of image pickup lens 2 with respect to image sensor 10 at the area adjacent to and periphery of the photoreceptor of image sensor 10. Positioning portion 14a is butted upon the surface (upper surface in FIG. 1) of glass plate 12 placed on the object side of image sensor 10 (the upper side in FIG. 1) to be exact, and fixed to glass plate 12 with prescribed adhesive 15 (hereinafter referred to as second adhesive). In this embodiment, the principal ingredient used in second adhesive 15 may be any of a thermosetting type adhesive and an UV curing type adhesive such as acrylic resin and epoxy resin, and the thermosetting type epoxy adhesive is more preferable.

Figure 3:
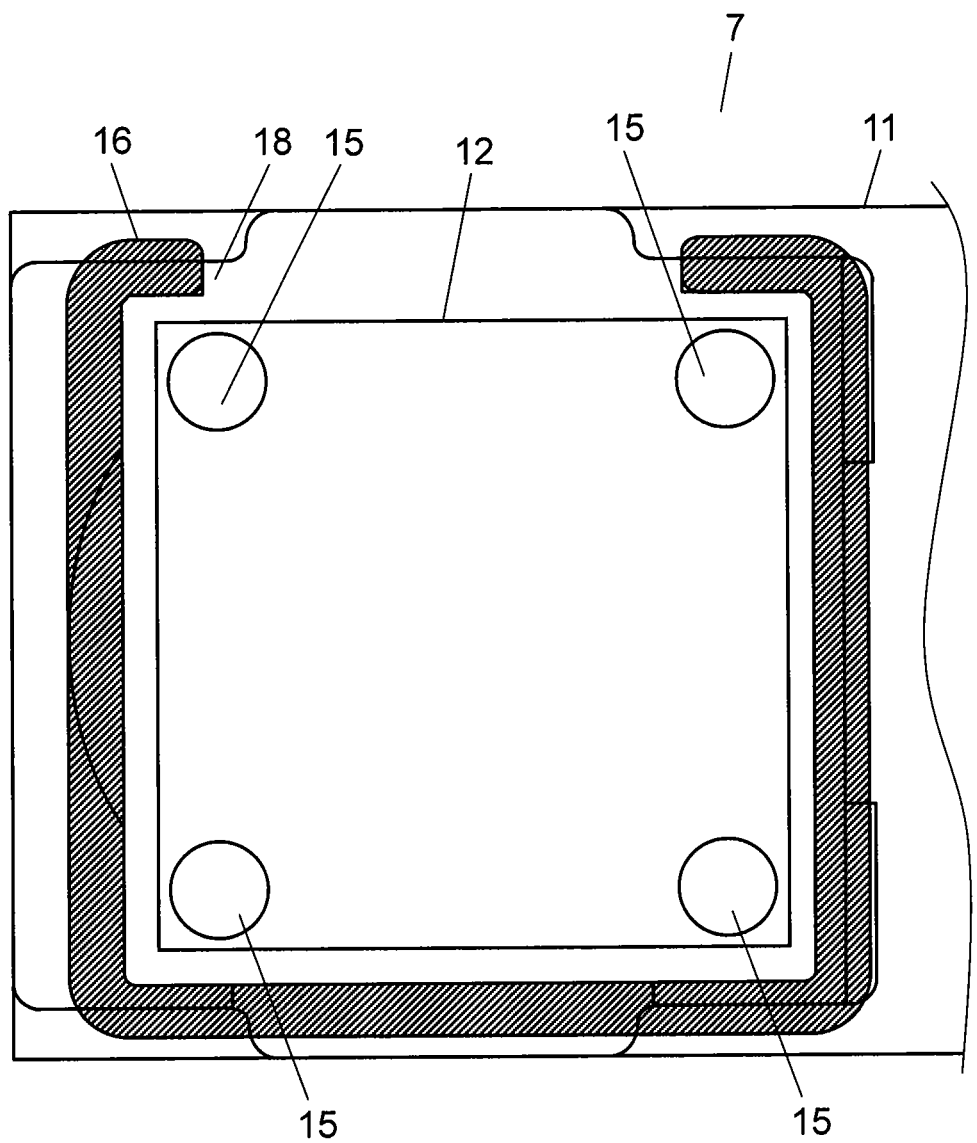
FIG. 3 is a sectioned plan view showing positions of a second adhesive and a third adhesive in the lens tube of FIG. 1.

FIG. 3 is a sectioned plan view showing positions of second adhesive 15 and third adhesive 16, which will be discussed later. Second adhesive 15 fixes support base 14 to glass plate 12 mounted to substrate 11 at a plurality of positions (a total of four positions in this embodiment) as shown in FIG. 3.

Second adhesive 15 is applied to the four positions near the corners on the bottom face of this support base 14.

Projecting portion 14b is formed in an area outside of the peripheral edge of image sensor 10 in a manner to protrude toward substrate 11. Projecting portion 14b has the bottom face of generally quadrangle in shape (square pipe) that surrounds the perimeter of image sensor 10. To be more specific, projecting portion 14b is so composed as to protrude toward substrate 11 in the area outside of the peripheral edge of glass plate 12, and it has the bottom face of generally quadrangle in shape (square pipe) so that it surrounds the perimeter of glass plate 12.

Figure 4A:
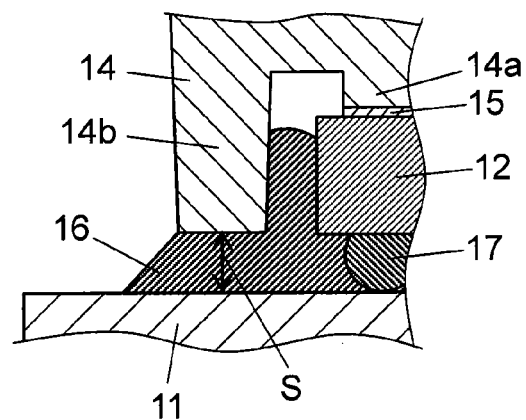
FIG. 4A is a partially enlarged sectional view showing one example of bonding condition with the third adhesive according to this embodiment.

Projecting portion 14b is fixed to the object side surface (the upper surface in FIG. 1) of substrate 11 with prescribed adhesive 16 (hereinafter referred to as third adhesive). In this embodiment, materials suitable for use as third adhesive 16 include any of adhesives made of silicone resin, allyl ester, acrylic resin, epoxy resin, polyimide, urethane resin, and the like, and it is more desirable to use an elastic adhesive of silicone modified polymer. FIG. 4A is a partially enlarged view showing one example of bonding condition with third adhesive 16. As shown in FIG. 4A, projecting portion 14b is not in contact directly with the surface of substrate 11, but it is spaced from the surface of substrate 11 by predetermined spacing S. In this embodiment, spacing S between the end face of projecting portion 14b and the surface of substrate 11 is set within a range of 0.1 mm and 0.5 mm, and it is desirable to set it in a range of 0.2 mm and 0.3 mm. This structure provides for third adhesive 16 to remain between projecting portion 14b and substrate 11, thereby bonding (fixing) projecting portion 14b to substrate 11. If spacing S exceeds 0.5 mm, it becomes necessary to increase the external dimensions of substrate 11 since third adhesive 16 is likely to spread to the outside of substrate 11. That is, the adhesive of a given amount is pre-coated on substrate 11 into a thickness generally larger than spacing S when projecting portion 14b is bonded to substrate 11. This means that the amount of the adhesive needs to be increased when there is a large spacing S since it requires adjustment of the amount according to the distance of spacing S, and increase in the amount of the adhesive leads to an increase in area of the adhesive to spread. On the other hand, the amount of the adhesive is reduced when spacing S decreases, and this decreases the area of the adhesive to spread. If spacing S becomes so small as less than 0.1 mm, third adhesive 16 is unlikely to get into spacing S, thereby giving rise to a problem of causing a shift in the position of support base 14 due to deficiency in the bonding strength, and an eventual defect of holder 8 becoming out of alignment with respect to the center axis of image sensor 10.

Projecting portion 14b bites into third adhesive 16 spread on substrate 11 from the upper side, as shown in FIG. 4A, so that it becomes fixed to substrate 11 after third adhesive 16 becomes hardened. A predetermined thickness of third adhesive 16 coated before bonding projecting portion 14b is to be thicker than the distance of spacing S between projecting portion 14b and the surface of substrate 11 when positioning portion 14a is butted on glass plate 12 provided above image sensor 10. It thus makes projecting portion 14b bite into third adhesive 16 from the above when positioning portion 14a is brought into the state of butting upon glass plate 12 above image sensor 10.

Here, the phrase of projecting portion 14b "bite into" third adhesive 16 means that a part of the end face of projecting portion 14b sticks downward (toward the substrate side) through the top surface of third adhesive 16 coated to the predetermined thickness on substrate 11, as shown in FIG. 4A. Although FIG. 4A shows the end face of projecting portion 14b bites into third adhesive 16 only partially, there can be other conditions such that the end face of projecting portion 14b bites into third adhesive 16 in its entirety or only a part thereof.

Figure 4B:
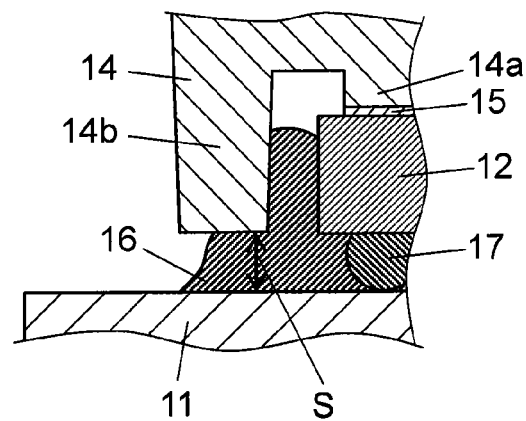
FIG. 4B is a partially enlarged sectional view showing another example of bonding condition with the third adhesive.
Figure 4C:
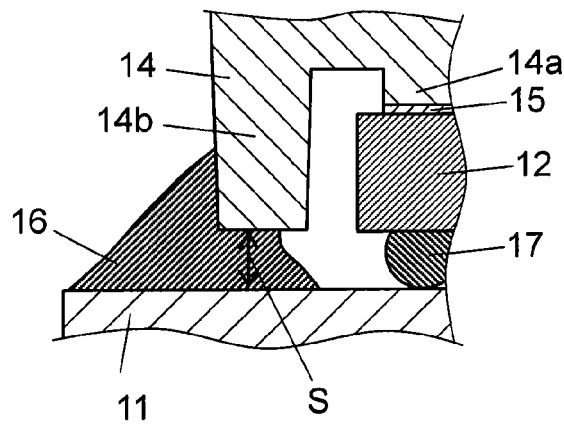
FIG. 4C is a partially enlarged sectional view showing still another example of bonding condition with the third adhesive.

Description is provided in more details. FIG. 4B and FIG. 4C are partially enlarged views showing other examples of bonding conditions with third adhesive 16. In FIG. 4B, projecting portion 14b bites into third adhesive 16 only partially at the side next to glass plate 12 provided above image sensor 10. In FIG. 4C, projecting portion 14b bites into third adhesive 16 only partially at the exterior side of it (the side opposite glass plate 12 above image sensor 10).

Third adhesive 16 has viscosity set higher than that of second adhesive 15. In addition, the thickness of this third adhesive 16 is larger than the thickness of second adhesive 15. Taking into account the ranges discussed above, spacing S between the end face of projecting portion 14b and the surface of substrate 11 is set to 0.2 mm, the thickness of third adhesive 16 is set to 0.3 mm that at least exceeds 0.2 mm, and the thickness of second adhesive 15 is set to 0.01 mm, which is smaller than 0.2 mm, to be more specific. It is desirable here that the thickness of third adhesive 16 is set to be lower than the upper surface of glass plate 12 in order for third adhesive 16 not to scatter and stick to the image forming area of image sensor 10.

Third adhesive 16 is applied to substrate 11 in a manner to cover (or to surround) the peripheral surface of image sensor 10 as shown in FIG. 3. In other words, image sensor 10 and glass plate 12 are formed into quadrangular shapes in a plane view, and third adhesive 16 is applied to substrate 11 in a manner to surround the individual sides of quadrangle glass plate 12 provided above image sensor 10 continuously into a quadrangle shape. However, third adhesive 16 does not completely surround glass plate 12 provided above image sensor 10, but it is applied to substrate 11 with a gap left in part. This gap portion serves as communicating path 18 (i.e., a part of one side at the top where the quadrangle shape formed with adhesive 16 is not connected in FIG. 3) for communicating between the inside of adhesive 16 (i.e., a space having glass plate 12 wherein image sensor 10 is provided) and the outside (i.e., a space outside of the space having glass plate 12 wherein image sensor 10 is provided). Heat and expanded air in the space around image sensor 10 can be discharged to the outside through this communicating path 18 in third adhesive 16, since second adhesive 15 is applied to positioning portions 14a provided on the surface side of holder 8 and third adhesive 16 has communicating path 18 formed through it.

As shown in FIG. 1, a part of third adhesive 16 lies sandwiched between projecting portion 14b provided on holder 8 and glass plate 12. Third adhesive 16 of high viscosity lying in this manner between projecting portion 14b and glass plate 12 effectively helps prevent holder 8 from shifting in the position.

Image sensor 10 is secured to printed circuit traces on one side of glass plate 12 opposite the object side (i.e., the lower side in FIG. 1) with connections made by using such means as bumps and solder balls though not shown in the figure. Glass plate 12 is fixed to substrate 11 via connecting portions 17 formed of bumps or solder balls, for instance, on the underside surface.

Infrared ray cut-off filter 13 is placed in a position between rear lens 22 and glass plate 12. Specifically, this infrared ray cut-off filter 13 is fixed to support base 14. More specifically, infrared ray cut-off filter 13 is disposed to the inner side of recessed bottom surface formed in the lower part of support base 14, as shown in FIG. 1.

Figure 5A:
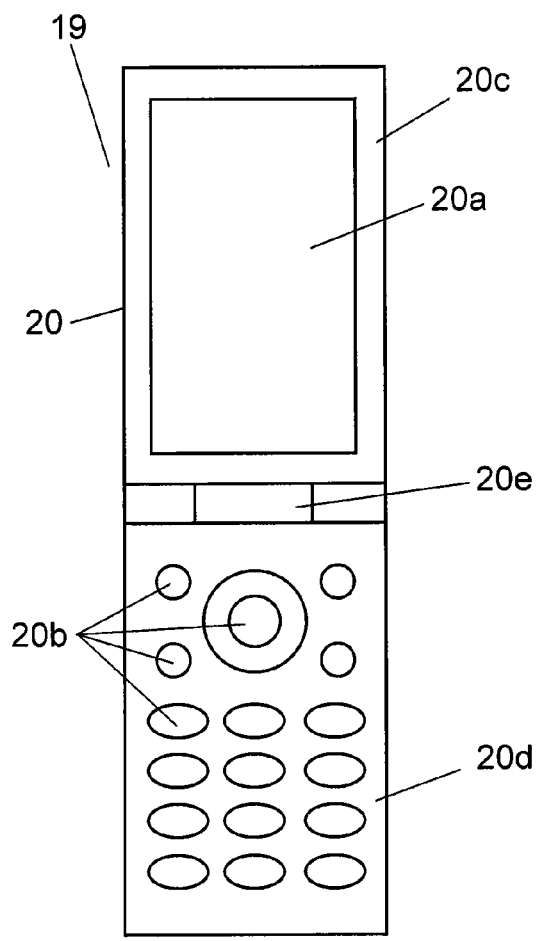
FIG. 5A is a plan view illustrating a portable terminal apparatus equipped with the lens tube according to this embodiment.
Figure 5B:
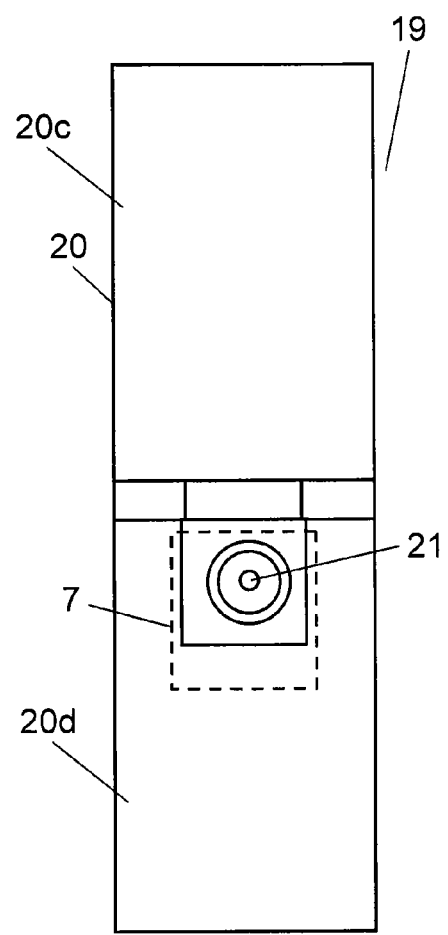
FIG. 5B is a backside view illustrating the same portable terminal apparatus.

Description is provided next of portable telephone 19 as an example of portable terminal apparatus equipped with image pickup device 7 of this embodiment. FIG. 5A illustrates a plan view of portable telephone 19 according to this embodiment, and FIG. 5B illustrates a backside view (rear side view) of the same portable telephone 19. Portable telephone 19 in this example is equipped with a camera, and it comprises main body case 20. Main body case 20 contains display 20a, control panel 20b, and image pickup device 7.

Main body case 20 has a fold-down type structure comprising two rectangular plate-like bodies, wherein plate-like bodies 20c and 20d are connected at corresponding ones of their narrow sides. Specifically, the structure includes hinge-like connection 20e, which makes main body case 20 foldable in one direction. That is, plate-like bodies 20c and 20d can be folded down in a manner that one side surface (front side illustrated in FIG. 5A) of plate-like body 20c faces the other one side surface (front side illustrated in FIG. 5A) of plate-like body 20d. As shown in details in FIG. 5A, one of plate-like body 20c composing main body case 20 has display 20a mounted to an inner surface (front side illustrated in FIG. 5A) thereof, and the other plate-like body 20d has control panel 20b mounted to an inner surface (front side illustrated in FIG. 5A) thereof. Main body case 20 is folded down to bring the surface provided with display 20a and the other surface provided with control panel 20b to closely face each other. Display 20a comprises a liquid crystal screen of a rectangular shape, for instance, and it displays information related to operation of the portable telephone. Control panel 20b is used to operate various functions of the portable telephone, and it comprises a number of buttons of circular and elliptical shapes. Image pickup device 7 is the type described in the above embodiment, and it is disposed in main body case 20. It is so arranged that one side having opening 33 (front lens 21) of lens barrel 3 is located in the surface of main body case 20 (front side illustrated in FIG. 5B) opposite the other surface provided with control panel 20b, as shown in FIG. 5B.

According to lens tube 1, image pickup device 7 and portable telephone 19 of this embodiment described above, rear lens 22 located nearest to the image-forming plane of lens tube 1 has peripheral edge 4 provided with barrel insert portion 41 of the outer diameter equal to or smaller than the inner diameter of lens holding portion 32. According to this structure, barrel insert portion 41 of rear lens 22 can be inserted (insertion fitted) in lens holding portion 32 along the same axis. This allows lens barrel 3 to have a dimension that matches only to the dimension of barrel insert portion 41 rather than matching with the maximum external dimension of rear lens 22. It can hence reduce the external dimensions of lens barrel 3 as a whole. In other words, the external dimensions of lens barrel 3 can be reduced (downsized) to an extent of reduction in the external dimensions of barrel insert portion 41 from the maximum external dimensions of rear lens 22. That is, image pickup device 7 therein housing lens tube 1 and portable telephone 19 equipped with image pickup device 7 can be downsized as a result of reduction in the external dimensions of lens barrel 3.

Lens tube 1 has pressure-bearing lens portion 42 of the diameter larger than the inner diameter of lens holding portion 32, and confronting surface 42a in continuity to barrel insert portion 41 at the position spaced from end surface 32a of lens holding portion 32. When barrel insert portion 41 of rear lens 22 is inserted in lens holding portion 32 for bonding and fixing rear lens 22 to lens barrel, there is left a space between end surface 32a of lens holding portion 32 and confronting surfaces 42a in pressure-bearing lens portion 42 at the opposite side of end surface 32a. Since this space can be filled with first adhesive 5, it is unlikely that first adhesive 5 sticks to the outer surface of rear lens 22 located nearest to the image-forming plane or any of the other lens surfaces of compound image pickup lens 2 (those lenses other than rear lens 22) housed inside lens barrel 3. It thus becomes possible to prevent first adhesive 5 used for bonding rear lens 22 and lens barrel 3 from sticking to the surfaces of image pickup lens 2 (i.e., the surface where incident light passes through), thereby avoiding the possibility of forming ghost images attributed to the lens surfaces and degradation of the resolution due to shifting in the optical axis of the lenses. Among the plurality of lenses of compound image pickup lens 2, front lens 21 located nearest to opening 33 of lens barrel 3 is so placed that the outer periphery of the object side surface (i.e., upper surface in FIG. 1) is in contact with the surface at the side facing the image-forming plane (i.e., the rear surface in FIG. 1) of lens supporting portion 31. In addition, front lens 21 is housed inside lens barrel 3 in a manner that outer lens surface 21a at the center portion other than the peripheral area is kept spaced from the image-forming plane side surface (the rear surface in FIG. 1) of lens barrel 3 by a predetermined gap exceeding 0 μm but not exceeding 50 μm. This configuration can prevent undesired light from entering image sensor 10 through openings outside of the effective diameter of the lens and suppress ghost images. The same advantages of suppressing ghost images due to first adhesive 5 and preventing degradation of the resolution can be achieved naturally in image pickup device 7 and portable telephone 19 that use lens tube 1 of this embodiment.

UV curing type adhesive demonstrates advantageous effects of reducing the working time and improving the assembling precision of the lenses when used for first adhesive 5 since it can be hardened in a few seconds while the lenses set to their positions with an assembling jig or the like tool. In addition, the UV curing type adhesive of low hardness, or a relatively soft type can reduce adverse influences to the lenses such as deformation. It is important in this case to properly select an adhesive material of optimum hardness because of the possibility that the adhesive cracks due to impact and the like stress if it is too soft. Adhesive materials of acrylic resin having hardness from Shore A-80 to Shore D-70 are specific examples of the adhesive material of optimum hardness.

Since the process of bonding and fixing is made after pressure-bearing lens portion 42 of rear lens 22 is pressed at the side near lens barrel 3 in the direction of the optical axis, it can effectively keep steadiness of the positional accuracy of image pickup lens 2 in the direction of the optical axis. Moreover, it is hardly unlikely to cause damages to the surface of rear lens 22 since mechanical means such as assembling jig is used when pressing pressure-bearing lens portion 42 of rear lens 22 against lens barrel 3.

In lens tube 1, the space between end surface 32a of lens holding portion 32 and confronting surface 42a of pressure-bearing lens portion 42 is set to a distance of 30 μm or larger but 1 mm or smaller, and more preferably between 50 μm and 500 μm. Therefore, when a large amount of first adhesive 5 is applied, for instance, a part of first adhesive 5 reaches the outside of lens holding portion 32 and increases the area of bonding. When the amount of first adhesive 5 is small, on the other hand, first adhesive 5 tends to form a fillet shape at both edges of the space. In either case, the embodied structure can effectively achieve the steady bonding strength between lens barrel 3 and compound image pickup lens 2 in addition to low profiling. It is also effective to provide roughness in any of end surface 32a of lens holding portion 32 and confronting surface 42a of pressure-bearing lens portion 42 where first adhesive 5 is applied to further improve the strength of bonding by increasing the bonding area.

Compound image pickup lens 2 is conducive to downsizing and wide angle photography since diameters of the individual lenses are increased in a successive order toward the image-forming plane.

The outer peripheral surface at the end of lens holding portion 32 of lens barrel 3 is tapered in the direction of the optical axis. This helps control a bulge of first adhesive 5 in the outward direction of lens barrel 3 while facilitating the application of first adhesive 5 to the spaced channel between end surface 32a of lens holding portion 32 and confronting surface 42a of pressure-bearing lens portion 42. The tapered shape also increases the area of bonding and helps improve the bonding strength as compared with a case wherein the surface is formed straight.

On the other hand, the inner peripheral surface at the end of lens holding portion 32 of lens barrel 3 has a shape of the letter R. This configuration facilitates ingress of first adhesive 5 into a space formed between lens holding portion 32 of lens barrel 3 and barrel insert portion 41 from the spaced channel between end surface 32a of lens holding portion 32 and confronting surface 42a of pressure-bearing lens portion 42. A result of this is to further increase the area of bonding, thereby improving the bonding strength.

Moreover, lens holding portion 32 of lens barrel 3 is also provided with a plurality of slits, holes, concavity and convexity, or the like at the end thereof. Since these slits, holes, or the like areas of lens barrel 3 are filled with first adhesive 5, they increase the area of bonding with rear lens 22, and improve the bonding strength.

Image pickup device 7 of this embodiment also enjoys all of the advantages related to lens tube 1 discussed above since it is equipped with lens tube 1. Besides the above, image pickup device 7 has additional advantage of, for instance, suppressing a bulge of first adhesive 5 in the outward direction of lens barrel 3 since first adhesive 5 can be filled in the spaced channel between end surface 32a of lens holding portion 32 and confronting surface 42a of pressure-bearing lens portion 42. This advantage avoids the possibility of first adhesive 5 to interfere with mechanical components facing the surface of first adhesive 5. Furthermore, image pickup device 7 of this embodiment has other advantages such as small size (downsizing) of housing 9 of image pickup device 7 attributed to reduction in the external dimensions achieved on lens barrel 3 in lens tube 1.

Moreover, portable telephone 19 of this embodiment has an advantage of achieving small size and light weight as a whole besides those of the above advantages provided by lens tube 1 and image pickup device 7 because it is equipped with the above image pickup device 7.

It should be noted that the lens tube, the image pickup device and the portable terminal apparatus described in the above exemplary embodiments are not intended to restrict the scope of this invention, and that the invention may be practiced in still many other ways without departing from the scope thereof.

In lens tube 1 of this embodiment, for example, compound image pickup lens 2 comprising four lenses may be modified to a combination of two lenses, for instance, instead of four. Furthermore, the cutout (e.g., D-cut groove or notch) formed in the part of the lens may be omitted. Moreover, although lens barrel 3 has male screw 34 in engagement with female screw 81 provided in image pickup device 7 for accommodating lens barrel 3, the structure may be modified to eliminate male screw 34. There are also other modifications possible to eliminate the tapered shape, or the plurality of slits, holes, depressions, or the like at the end of lens holding portion 32 of lens barrel 3, or the R-shaped surface at the end of lens holding portion 32.

In lens tube 1 of this embodiment, lens barrel 3 and rear lens 22 are bonded after rear lens 22 is pressed against lens barrel 3. In other words, the process of bonding and fixing is carried out while barrel insert portion 41 of rear lens 22 is press-fitted into lens holding portion 32 of lens barrel 3. However, besides using the above method, it is also possible to bond and fix rear lens 22 and lens barrel 3 by means of a sucking force exerted on rear lens 22 after rear lens 22 is pressed against lens barrel 3. In this method, light shield (spacer) 6 is provided with a cutout (e.g., D-cut groove or notch) formed in alignment with the cutout portion of the lens, so that rear lens 22 and lens barrel 3 are bonded and fixed while sucking rear lens 22 efficiently.

First adhesive 5 may be of any materials other than that described in this embodiment, such as an UV curing type adhesive provided with an additional function that it be hardened by heat, visible light, moisture, anaerobic gas and the like. Such an adhesive can be hardened completely by supplementing spots not hardened by the ultraviolet rays alone, if any happens to exist.

As has been described, the lens tube of the present invention comprises a compound image pickup lens made up of a plurality of lenses and a cylindrical lens barrel retaining the compound image pickup lens within an inner wall thereof. In the lens tube of the present invention, the lens barrel has a lens supporting portion formed at one end thereof for totally or partially supporting a peripheral edge at one side surface of the compound image pickup lens in the direction of optical axis, and a lens holding portion formed at the other end thereof confronting totally or partially a peripheral edge at the other side surface of the compound image pickup lens. In the lens tube of the present invention, a rear lens located nearest to an image-forming plane in the compound image pickup lens has a barrel insert portion formed around a peripheral edge, which is inserted in the lens holding portion. In addition, the lens tube of the present invention also comprises a pressure-bearing lens portion in continuity to the barrel insert portion, of an outer diameter larger than an inner diameter of the lens holding portion, and having a confronting surface at a position spaced from an end surface of the lens holding portion. Furthermore, the lens tube of the present invention is so constructed that at least the end surface of the lens holding portion and the confronting surface of the pressure-bearing lens portion are fixed with an adhesive material through the spaced portion.

It is possible according to the above structure to insert the barrel insert portion into the lens holding portion since the peripheral edge of the rear lens located nearest to the image-forming plane has the barrel insert portion having a diameter equal to or smaller than an inner diameter of the lens holding portion. In other words, a part of the rear lens can be press-fitted in the barrel insert portion. Accordingly, it is safe to set the outer dimensions of the lens barrel to be just sufficient for having the barrel insert portion fitted therein without taking into account the maximum external dimensions of the rear lens. It is thus possible to reduce the external dimensions. An adhesive material used for bonding and fixing the rear lens located nearest to the image-forming plane to the lens tube is applied to a space formed between the end surface of the lens holding portion and the confronting surface of the pressure-bearing lens portion located on the opposite side with the space. It is therefore unlikely that the adhesive sticks to the outer surface of the rear lens located nearest to the image-forming plane or any surfaces of the other lenses (those lenses other than the rear lens) housed inside the lens barrel.

The lens tube of the present invention is so constructed that the space between the end surface of the lens holding portion and the confronting surface of the pressure-bearing lens portion is set to a distance of 30 μm or larger but 1 mm or smaller. It thus becomes possible by virtue of this structure to reduce a distance of the space between the end surface of the lens holding portion and the confronting surface of the pressure-bearing lens portion. Accordingly, the structure can achieve steady bonding strength between the lens barrel and the image pickup lens (i.e., the rear lens) in addition to low profiling (downsizing).

Moreover, the lens tube of the present invention has a structure comprising a plurality of lenses to constitute the compound image pickup lens, and the individual lenses have their diameters increased in a successive order toward the image-forming plane. This structure can hence provide the lens tube of small size with capability of wide angle photography.

Furthermore, the lens tube of the present invention has a structure wherein the outer peripheral surface at the end of the lens holding portion is so tapered that the outer diameter becomes smaller toward the end. It is by virtue of this structure to help control a bulge of the adhesive in the outward direction of the lens barrel, and facilitate application of the adhesive to the spaced channel between the end surface of the lens holding portion and the confronting surface of the pressure-bearing lens portion, since the outer peripheral surface at the end of the lens holding portion has the tapered shape.

In addition, the lens tube of the present invention has a structure wherein the inner peripheral surface at the end of the lens holding portion has a shape of the letter R, of which the inner diameter becomes larger toward the end. This configuration facilitates ingress of the adhesive into the space formed between the lens holding portion and the barrel insert portion from the spaced channel between the end surface of the lens holding portion and the confronting surface of the pressure-bearing lens portion, thereby increasing the area of bonding and improving the bonding strength.

Moreover, the lens tube of the present invention has a structure provided with a plurality of slits or holes in the end of the lens holding portion. This structure can increase the area of bonding with the rear lens and improve the bonding strength since these slits or holes of the lens barrel can be filled with the adhesive.

The image pickup device of the present invention comprises a lens tube of the above structure, a holder retaining the lens tube, and an image sensor disposed with the center of image-forming plane in alignment with the optical axis of the lens tube retained in the holder.

According to this structure, the spaced channel between the end surface of the lens holding portion and the confronting surface of the pressure-bearing lens portion is filled with the adhesive. Since it has the advantage of suppressing a bulge of the adhesive in the outward direction of the lens barrel, it can avoid the possibility of the adhesive to interfere with mechanical components facing the surface of the adhesive. The structure also has other advantages such as small size (downsizing) of the housing of the image pickup device since it helps reduce the external dimensions of the lens barrel in the lens tube.

In addition, the portable terminal apparatus of the present invention has a structure comprising an image pickup device of the above configuration. The structure equipped with the above lens tube achieves downsizing of the whole unit. The structure also has an advantage of suppressing the possibility of forming ghost images and degradation of the resolution attributed to the adhesive used for bonding the lens tube and the rear lens.

INDUSTRIAL APPLICABILITY

The lens tube and the image pickup device of the present invention are useful for portable terminal apparatuses such as mobile phone devices since they have advantages of suppressing the possibility of forming ghost images attributed to lens surfaces and degradation of resolution due to shifting in the optical axis of the lenses.

REFERENCE MARKS IN THE DRAWINGS

1 Lens tube
2 Image pickup lens
2 Cutout
3 Lens barrel
3a Space
4 Peripheral edge
4b Recessed portion
5 First adhesive
6 Light shield
7 Image pickup device
8 Holder
9 Housing
10 Image sensor
11 Substrate
12 Glass plate
13 Infrared ray cut-off filter
14 Support base
14a Positioning portion
14b Projecting portion
15 Second adhesive
16 Third adhesive
17 Connecting portion
18 Communicating path
19 Portable telephone
20 Main body case
20a Display
20b Control panel
20c, 20d Plate-like body
20e Connection
21 Front lens
21a Outer lens surface
22 Rear lens
31 Lens supporting portion
32 Lens holding portion
32a End surface
33 Opening
34 Male screw
41 Barrel insert portion
42 Pressure-bearing lens portion
42a Confronting surface
81 Female screw

The invention claimed is:

1. A lens tube comprising:
a compound image pickup lens having a plurality of lenses; and
a cylindrical lens barrel retaining the compound image pickup lens within an inner wall thereof, wherein
the lens barrel has a lens supporting portion formed at one end thereof for totally or partially supporting a peripheral edge at one side surface of the compound image pickup lens in a direction of optical axis, and a lens holding portion formed at the other end thereof confronting totally or partially a peripheral edge at the other side surface of the compound image pickup lens, a rear lens located nearest to an image-forming plane in the compound image pickup lens has a barrel insert portion around a peripheral edge, which is inserted in the lens holding portion with a margin of fitting allowance for clearance fit against an inner peripheral surface at an end of the lens holding portion, and an out-of-barrel lens portion in continuity to the barrel insert portion, of an outer diameter larger than an inner diameter of the lens holding portion, and having a confronting surface at a position spaced from an end surface of the lens holding portion, and at least the end surface of the lens holding portion and the confronting surface of the out-of-barrel lens portion are fixed with an adhesive material through a spaced portion.

2. The lens tube of claim 1, wherein a distance of the spaced portion between the end surface of the lens holding portion and the confronting surface of the out-of-barrel lens portion is 30 μm or larger but 1 mm or smaller.

3. The lens tube of claim 1, wherein the plurality of lenses constituting the compound image pickup lens have diameters increased in a successive order toward the image-forming plane.

4. The lens tube of claim 1, wherein an outer peripheral surface at an end of the lens holding portion is so tapered that a diameter of the outer peripheral surface becomes smaller toward the end.

5. The lens tube of claim 1, wherein an inner peripheral surface at an end of the lens holding portion has a shape of curved surface, and a diameter of the surface becomes larger toward the end.

6. The lens tube of claim 1, wherein the lens holding portion is provided with a plurality of slits or holes in an end portion thereof.

7. An image pickup device comprising the lens tube of claim 1, a holder retaining the lens tube, and an image sensor disposed with the center of image-forming plane in alignment with an optical axis of the lens tube retained in the holder.

8. A portable terminal apparatus comprising the image pickup device of claim 7.

* * * * *